Aug. 6, 1940.                M. MAUL                2,210,552
                        CARD PUNCHING MACHINE
                       Filed April 27, 1939        8 Sheets-Sheet 1

INVENTOR
Michael Maul
BY
ATTORNEYS

Aug. 6, 1940.                M. MAUL                    2,210,552
                       CARD PUNCHING MACHINE
                    Filed April 27, 1939        8 Sheets-Sheet 2
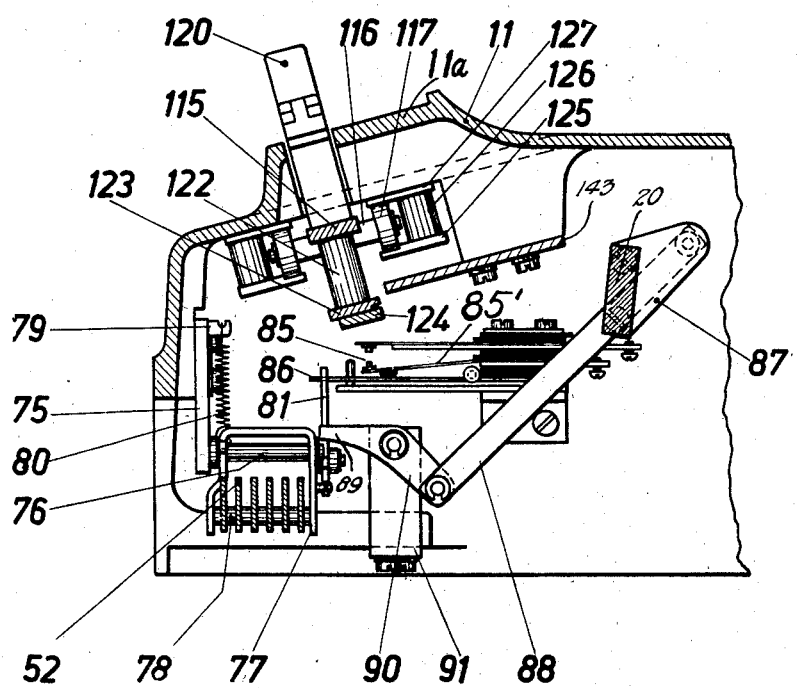
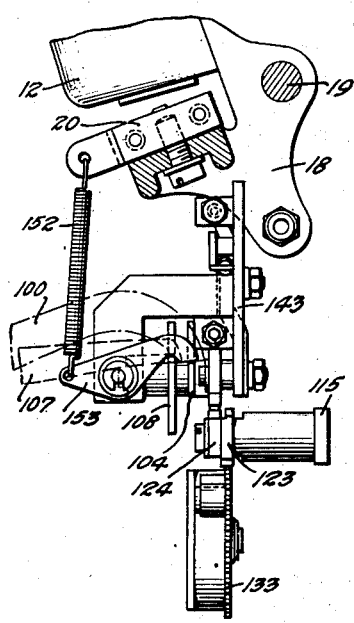
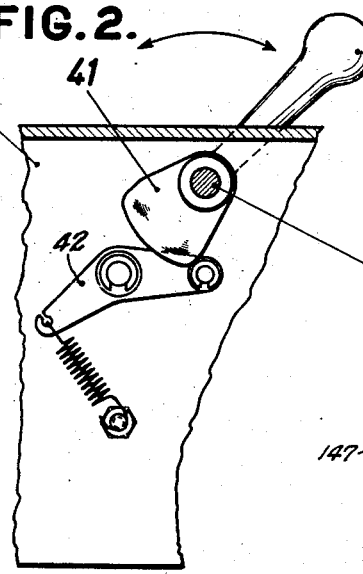
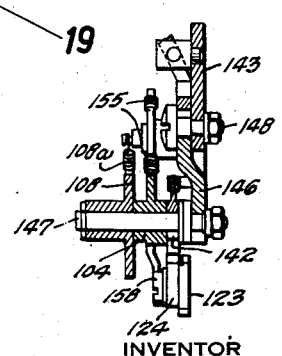
INVENTOR
Michael Maul
BY
ATTORNEYS Aug. 6, 1940.   M. MAUL   2,210,552
CARD PUNCHING MACHINE
Filed April 27, 1939   8 Sheets-Sheet 5

INVENTOR
Michael Maul
BY
ATTORNEYS

Aug. 6, 1940.                M. MAUL                2,210,552
                        CARD PUNCHING MACHINE
                    Filed April 27, 1939        8 Sheets-Sheet 6
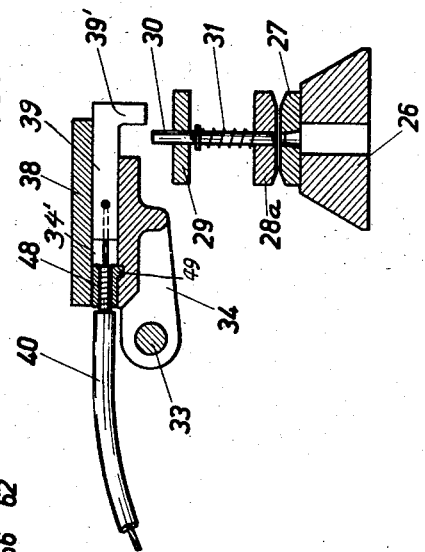
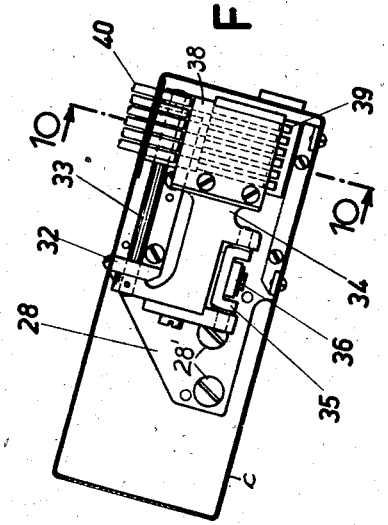
INVENTOR
Michael Maul
BY
ATTORNEYS

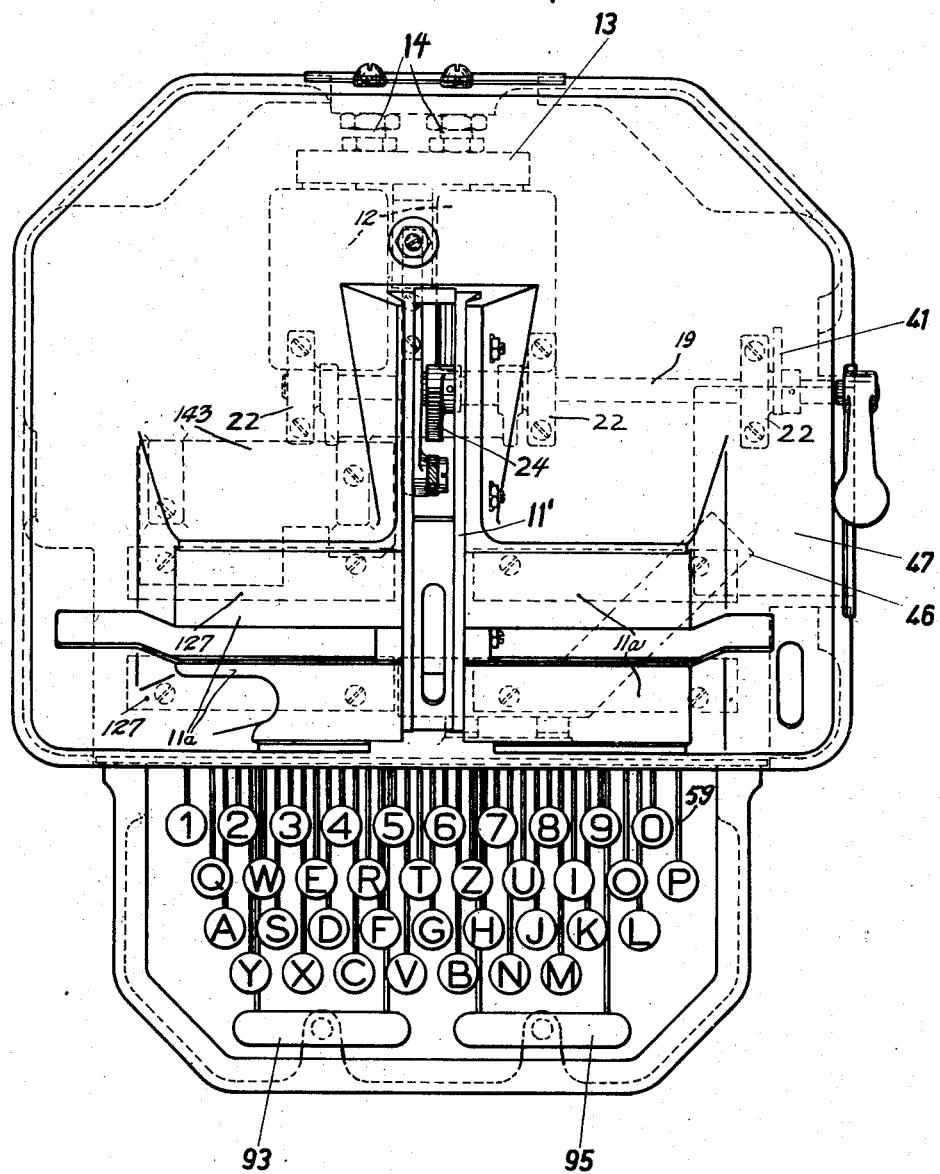

Aug. 6, 1940.   M. MAUL   2,210,552
CARD PUNCHING MACHINE
Filed April 27, 1939   8 Sheets-Sheet 8

INVENTOR
Michael Maul
BY
W. M. Wilson
ATTORNEYS

Patented Aug. 6, 1940

2,210,552

UNITED STATES PATENT OFFICE 2,210,552

CARD PUNCHING MACHINE

Michael Maul, Berlin-Johannisthal, Germany, assignor to the firm Deutsche Hollerith Maschinen Gesellschaft m. b. H., Berlin-Lichterfelde, Germany Application April 27, 1939, Serial No. 270,324
In Germany May 24, 1938

6 Claims. (Cl. 164—112)

This invention relates to a machine for operating on record cards, particularly to a machine for punching data representations into record cards which are subsequently used to control accounting machines according to the data representations. The invention is especially concerned with the punching of plural deck cards or cards with vertically spaced data designating decks, each equivalent to a single card unit. Each deck of a card has parallel columns of index or perforation positions to be perforated according to a selected code for designating a character in each column. Such a plural deck card, after being punched, has a plurality of rows of character representations, one row above another.

Further, the invention particularly relates to the punching of lateral sections or columns of a multiple deck card, one section or column at a time, by moving the card laterally with respect to punching means.

According to the disclosure of my previous Patent 1,962,607, the punching of plural deck cards is effected by a plurality of punch sets, each set adapted to punch a different deck of the card, with the further provision of a single set of character selecting keys adapted to be alternatively correlated with any of the punch sets to control punching of one card deck at a time.

The present invention avoids the necessity of providing a plurality of punch sets, one for each card deck, and utilizes only a single punch set for punching any one of the card decks. The punch set, in the present instance, comprises a column of punches for punching one column of a deck at a time, and the card is fed laterally step by step past the punch column to enable the columns to be punched one at a time and in succession. In order to provide for the punching by the single column of punches of any of the card decks, an object of the present invention is to provide means for shifting the position of the punches vertically with respect to the card so as to correlate the punch column with a selected one of the decks.

The invention contemplates the provision of a movable carriage for the set of punches, with the carriage being movable vertically or in the same direction in which a card column extends, so as to bring the punches into position for punching any one of the vertically offset card decks. At the same time the mounting of the punch carriage is such that in any shifted position thereof, the card is free to be moved laterally with respect to the punches. It is further contemplated that the punch carriage carry not only the set of punch pins but also the corresponding punch die, the punch interposers, the punch operating means, and a cover for the punch assembly. The parts carried by the punch carriage may be referred to, collectively, as a punch unit.

To guide the punch operator, it is desirable to write or print, at one end of each column of the card, the character to be punched in coded form into the column. In previous machines, with a card column in punching position, the punch supporting framework covers and conceals the entire column, preventing the operator from viewing the character at one end of the column and using the character as a guide to the punching of the same column. One purpose of the present invention is to overcome this difficulty by providing a punch unit construction which exposes the character written at one end of the column while this same column is in punching position. Further, the invention provides for the exposure of the written or printed characters of the columns of any selected one of a plurality of decks of a plural deck card during the punching of the selected deck. To attain these objects, the invention provides for the holding and guiding framework of the punches to be supported cantilever-fashion, terminating short of the row of characters at the foot of the columns of the card deck which is in correlation with the punch unit, and thereby exposing the character of a column while this same column is in punching position.

In the preferred embodiment of the invention, the punch carriage is slidably mounted on the machine frame to adjust the punches into position for punching either of the decks of a double deck card. To avoid encumbering the punch carriage with the power actuator which actuates the punches, it is preferred to support this power actuator on a stationary part of the machine frame. In order to adapt the actuator for operating the punches when the punch carriage is in either of its different positions, the actuator is connected through a self-adjusting linkage to a punch depressing means which is supported by the carriage for movement with the punches and dies. The punch depressing means includes a punch depressor device slidably carrying the front portions of the punch interposers, and upon depression of the device, the interposer elements positioned above the heads of selected punches will force the punches through the record card. The power actuator is in the form of a magnet stationarily carried by the frame and the armature of which is connected through a link to the punch depressor device. In order to enable the link to shift with the punch depressor device into the different vertically spaced positions of adjustment of the punch carriage while retaining its actuating connection to the depressor device, and without disturbing the position of the actuating armature, a Cardan joint or universally rockable connection is provided between the link and the depressor device. The connection between the armature of the actuating magnet and the punch depressing means is thereby of such a nature as to enable the punches to be actuated with the same pressure in either position of adjustment of the punch carriage.

It is also preferred to set the interposers for the punches mechanically through Bowden cables actuated by combs, selectively set under control of a character selecting keyboard, the combs being particularly advantageous in the punching of combinational hole representations of the characters.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Fig. 2 is a sectional view indicating the locking means for the handle which adjusts the punch carriage;

Fig. 8 is a section along lines 8—8 of Fig. 4;

Fig. 9 is a top view of a punch carriage with its cover in section;

Fig. 10 is a section along lines 10—10 of Fig. 9 drawn on an enlarged scale;

Fig. 11 is a section along lines 11—11 of Fig. 5;

Fig. 12 is a plan view of the machine with the punch carriage and the card carriage removed;

Fig. 13 is a detail side view of operating connections to the escapement mechanism of the card carriage;

Fig. 14 is a section through the escapement pawl mechanism; and

Figure 1:
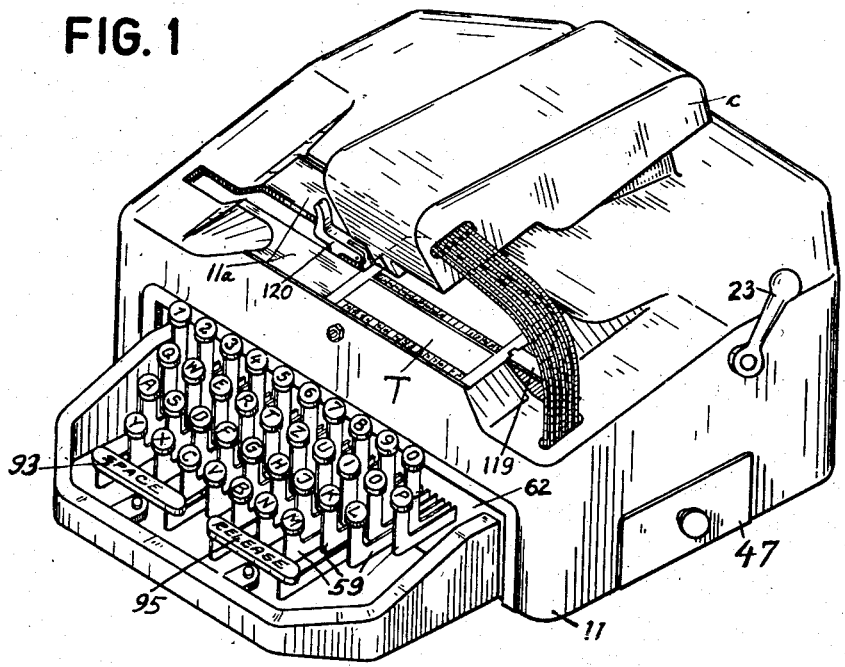
Fig. 1 is a perspective view of the machine.

The machine comprises a main frame and housing 11 enclosing the internal mechanism including double card punch magnet 12 (Figs. 4, 8, and 12) which is fastened to a yoke 13, secured by screw means 14 to the rear wall of the housing. Carried by yoke 13 is an angle 15 supporting a stop screw 16, engaging the yieldable spring packet 17, on one arm of the armature lever 18, so as to limit and dampen retractive movement of the armature lever effected under the influence of a spring 18'. Lever 18 is rockably mounted on a shaft 19 and has an armature piece 20 opposite the poles of magnet 12. When the magnet is energized, it attracts armature piece 20 to rock lever 18 clockwise (Fig. 8) until packet 17 encounters fixed stop screw 21 to limit and dampen clockwise movement of the armature lever.

Figure 6:
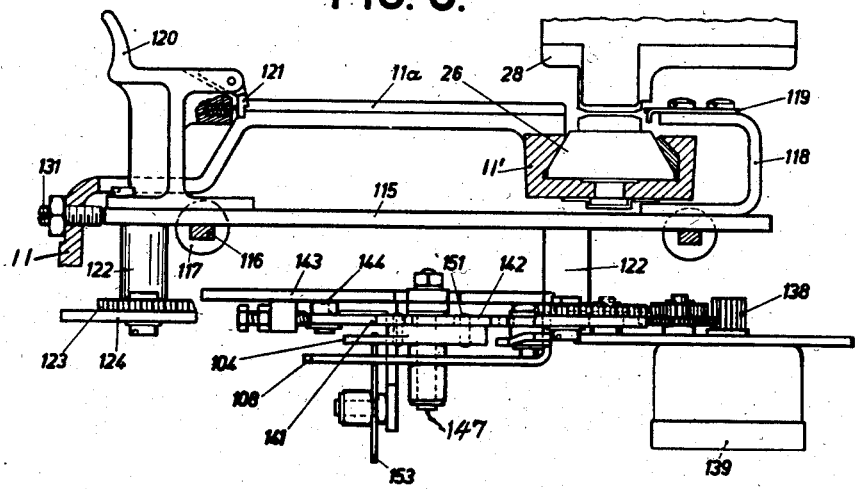
Fig. 6 is a front sectional view indicating the card carriage and parts of the escapement mechanism.

Shaft 19 is rotatably mounted in journal brackets 22 carried by the main frame, and its right hand end extends outside the frame to rigidly carry an external handle 23. Inside the housing, shaft 19 rigidly carries a gear segment 24 meshed with the rack 25 at the bottom of the slide 26 which forms the base of the punch carriage. Slide 26 is of dovetail cross-section to slidably fit into the correspondingly shaped guide groove formed in the top central frame bar 11' of main frame 11 (Figs. 6 and 12).

Figure 3:
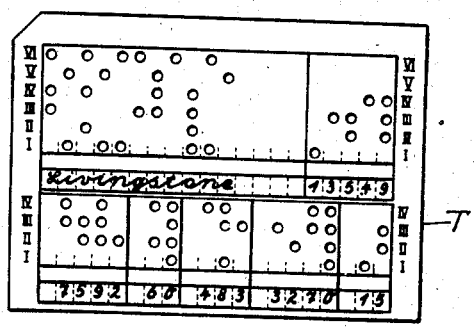
Fig. 3 is an example of a double deck record card which may be punched by the present machine.

The forward portion of slide 26 carries the punch die or matrix plate 27 having the die holes into which the punches move to perforate the record and through which the card waste falls. Extending above the slide 26 and secured by screws 28' to the rear portion of the slide is a bracket 28. The forward portion of bracket 28 is channeled and above the die plate 27 is bridged by a stripper and lower punch guide plate 28a (see Figs. 8 and 10). Spaced above and parallel to the stripper plate 28a is an upper punch guide plate 29 secured to and bridging the top of bracket 28. The plates 28a and 29 guide the column of six punches 30 spaced similarly to the six index or perforation positions of a column of the upper deck of the record card T (see Fig. 3) adapted to be punched with an alphabetic character representation (see Fig. 15). The front four punches only are utilized for punching numerical representations into columns of the lower card deck. Springs 31 (Fig. 10) normally maintain the punches in upper, idle positions. The bracket 28, as described above, is supported cantilever-fashion by the base 26 of the punch carriage and, together with guide plates 28a and 29, forms a carrier for the punches 30 which is free of support at the front end and terminates short of the front portion of plate 27. Thus when a card is disposed beneath the lower punch guide plate 28a and rests on die plate 27, the lower ends of the columns of both decks of the card shown in Fig. 3 are uncovered, enabling the operator to view the character written in the column at punching position and to use this written character as a guide to the punch selection for the same column.

On bracket 28 is fastened the mounting piece 32 for journaling the rock shaft 33 to which is pinned the rock plate 34. Rock plate 34 is connected through a universally rockable, Cardan joint 35 to the upper end of a link 36 which is pivoted at the lower end by a pin 37 to the armature lever 18. Plate 34 is formed with guide slots 34' open at the top and closed by a depressor plate 38 secured to the top of plate 34 so as to form closed guideways for six punch interposer slides 39, each movable above one of the six punches. The forward end of each slide is formed with an interposer lug 39' which, in the position shown in Fig. 10, is remote from the head of the corresponding punch 30. To select a punch for operation, the corresponding interposer 39 is moved to the rear to locate its interposer lug 39' directly above the head of the punch. The movement of each interposer slide 39 is effected by one of the Bowden wires 40 connected at the upper end to the slide, as indicated in Fig. 10. The Bowden wires are operated under control of the keyboard (see Fig. 1) in a manner which will be explained further on.

A cover c for the punch carriage is fastened to bracket 28. As described above, the punch carriage comprises base slide 26 carrying punch die plate 27, bracket 28 provided with punch guide plates 28a and 29, punches 30, slotted rock plate 34, depressor plate 38, and punch interposer slides 39. The punch carriage may be manually shifted to either of two alternative positions. In the rear position shown in Fig. 1, the punches and dies are in position to punch the upper card deck, and in the forward position, shown in Fig. 8, the punches and dies are adapted to punch the lower card deck. To shift the punch carriage from the rear position to the forward position the operator rocks handle 23 forwardly. Handle 23, in turn, rocks shaft 19 which through gear sector 24 and meshed rack 25 slides the punch carriage forwardly. The reverse movement of the handle 23 returns the punch carriage to the position shown in Fig. 1. The punch carriage is impositively locked in either of its positions by coaction of a sector 41 (Figs. 2 and 12), secured to shaft 19, with a spring pressed lock lever 42. The forward position of the punch carriage is determined by engagement of the front end of slide 26 with a stop screw 43 (Fig. 8) and its rear position by engagement of the back of the slide with a stop screw 44.

During the shifting of the punch carriage from one position to the other, the upper end of link 36 of the punch operating means, due to the Cardan joint connection 35 to rock plate 34, is able to move freely with the punch carriage without affecting its operating relationship to the rock plate.

The card waste punched out of the card falls through the open portion of slide 26 below die plate 27 (see Figs. 8 and 10) and onto the inclined sheet 45 from where it drops into chute 46 which leads the waste to a box 47 insertable below the chute through an opening in the right side of housing 11 (also see Figs. 1, 5, and 12).

*Punch selecting means*

Figure 4:
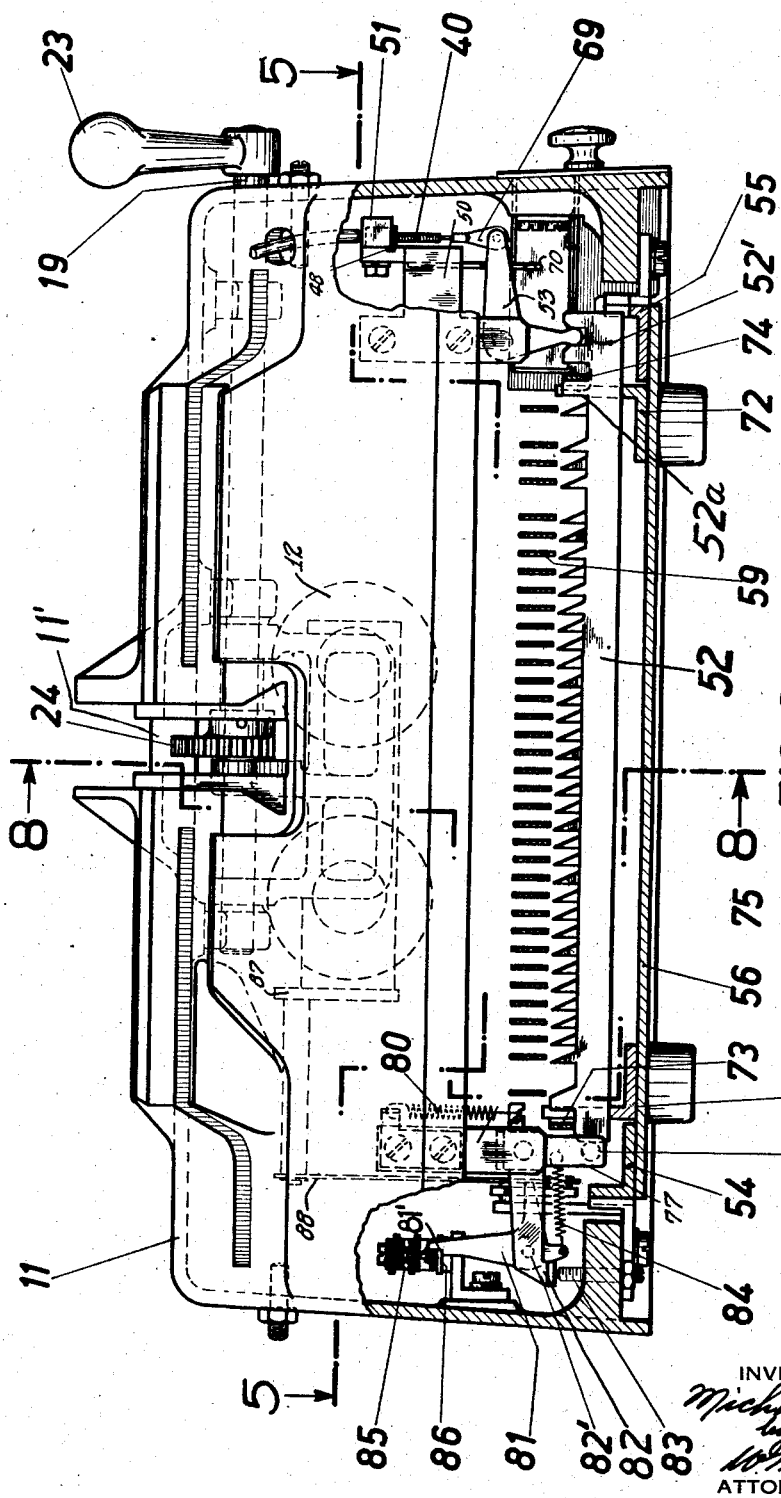
Fig. 4 is a front, partially sectional view of the machine with the punch carriage and the card carriage removed.

The punch selecting means includes interposer slides 39 of the punch carriage and the Bowden wires 40, already referred to as connected at their upper ends to the interposer slides. The upper end of each Bowden cable sleeve is secured to a plug 48 fitted within the guide slot 34' of the associated interposer slide and anchored by a projection 49 to the rock plate 34 (see Fig. 10). As indicated in Figs. 4 and 5, the lower ends of the Bowden cable sleeves are similarly anchored between a fixed angle plate 50 and a U-shaped holder 51 fastened to the angle plate. The lower end of each of the six Bowden wires is attached to a shoe 69 (Fig. 4) pivotally connected to the free end of the horizontal arm of a bell crank lever 53. The free end of the vertical arm of each of the six levers 53 is rounded and has a swivel fit within a slot 52' of one of the six combination punch selector slide bars 52 (also see Fig. 15).

Figure 5:
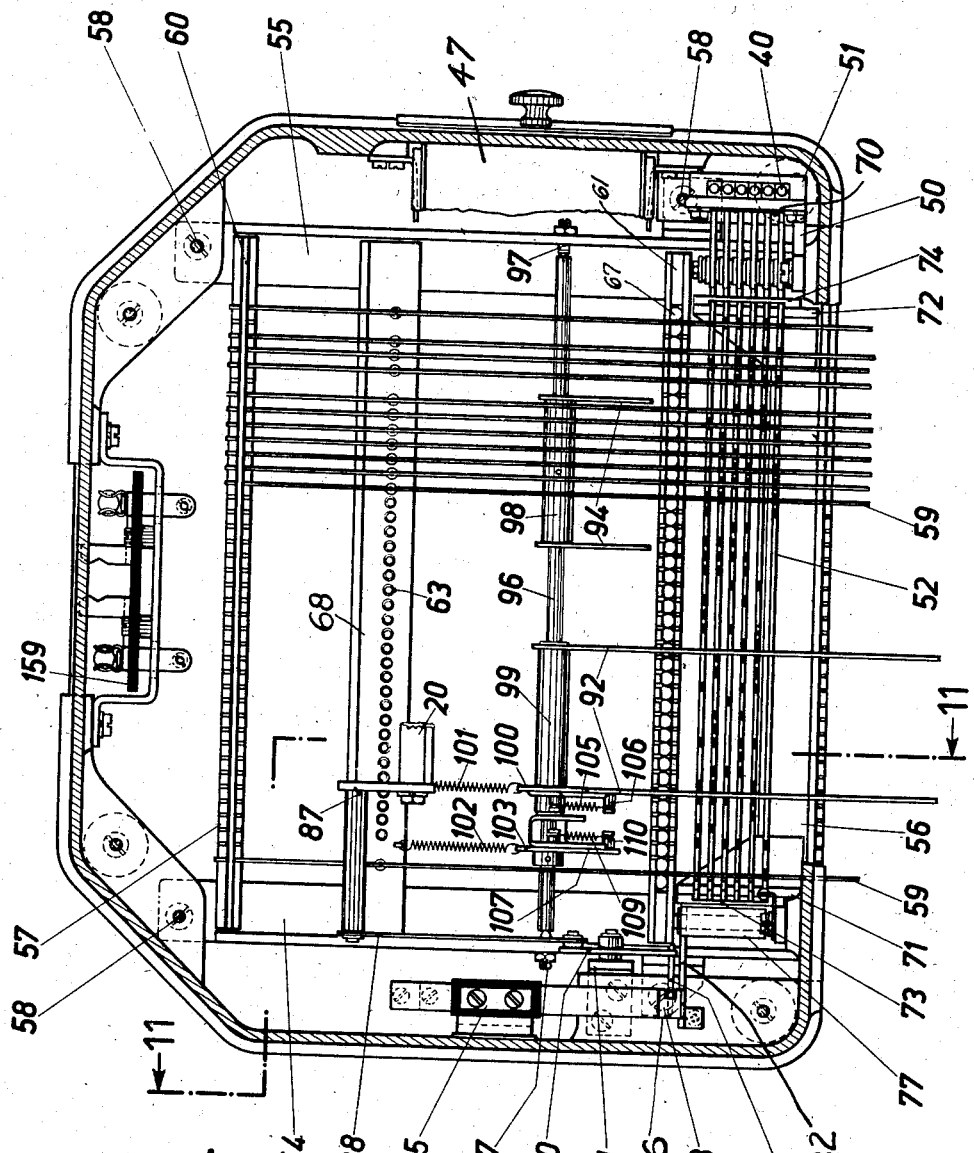
Fig. 5 is a section along lines 5—5 of Fig. 4.

Inside main frame and housing 11 is an open subframe comprising side angle bars 54 and 55, front angle bar 56, and rear cross bar 57, the subframe being secured by screws 58 to the main frame (see Figs. 4, 5, and 8). The character keys of the keyboard (see Fig. 1) comprise key levers 59 extending into the housing 11 and at their rear ends passing into the guide slots formed in rear cross bar 57 (see Fig. 5). The bar 57 is also channeled along the top, and, inside the channel, carries a cross shaft 60 engaging into notches at the rear ends of the key levers to serve as a common pivot for the key levers. Intermediate their ends, the key levers pass through slots of a comb bar 61 (see Fig. 5), parallel to bar 57 and also a part of the subframe. The slots of bars 57 and 61 guide the key levers and constrain them to vertical movement within their own planes. Additional guide means for the key levers is provided by a front comb plate 62 (Figs. 1, 5, and 8). Compression springs 63 seated on screws 64 (Fig. 8) urge the key levers upwardly into engagement with a stop bar 65 which is of resilient material to dampen the blow of the key levers when they are restored. Screws 64, seating springs 63, are threaded into an angle bar 68 which is parallel to bars 57 and 61 and also a part of the subframe. The screws are retained in adjusted positions by engagement with a spring bar 66 secured to the angle bar 68. To prevent more than one key lever 59 at a time from being depressed, the usual ball lock is provided comprising balls 67 lying in the channel provided at the top of comb bar 61.

Figure 15:
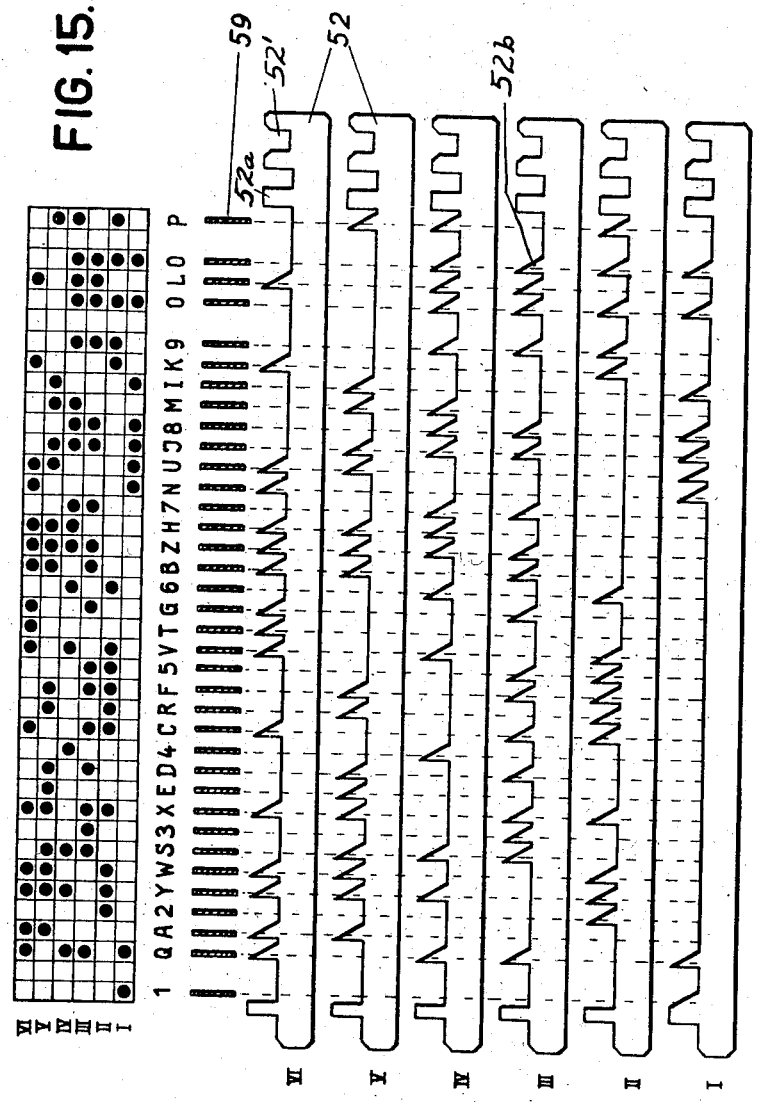
Fig. 15 illustrates the combinational code and the arrangement of the key levers and the association of key levers and comb bars for selecting the punches to punch the code designations.

Located between the comb bar 61 and the front of the housing 11, and underneath the key levers 59, are the six combination punch selector bars 52, previously referred to. Bars 52 are slidably mounted for movement in a horizontal direction by slotted guide angles 71 and 72 and held down by engagement with bars 73 and 74, the latter bar also engaging with the upstanding lugs 52a (Figs. 4 and 15) of the bars 52 to limit their movement to the right (Fig. 4) to their normal, rest positions. The coded arrangement of the key levers 59 with respect to the inclined comb teeth 52b of combination selector bars 52 is indicated in Fig. 15. The depression of a numeral or letter key will cause engagement of its key lever 59 with the inclined side of one or more teeth 52b so as to move one or more slides 52 to the left, in combinations indicated in Fig. 15. As a slide 52 is actuated by a key lever 59 to the left, it rocks the connected crank lever 53 clockwise (Fig. 4), the lever pulls down on the connected Bowden wire 40, and the Bowden wire retracts the connected interposer slide 39 (see Fig. 10 to set the interposer lug 39' thereof above the head of the associated punch 30. The punch magnet 12 is then energized to cause operation of the punches. The energization of the punch magnet occurs after the punch selection and as a result of actuation of one or more of the selector slides 52 by a numeral or letter key, in a manner which will now be explained.

A vertically disposed bar 75 at the left of the selector slides 52 (as viewed in Fig. 4) is fastened to the machine frame (see also Fig. 11). Extending horizontally from plate 75 is a stud 76 for pivotally mounting an inverted U-shaped yoke 77, the legs of which are joined by a pin 78. The pin 78 extends across the left ends of all the selector slides 52 so that upon actuation of any slide 52 to the left by operation of a key lever 59, the left edge of the slide acts on pin 78 to rock the yoke 77 clockwise (Fig. 4). A spring 80, extending between an anchoring piece 79 and the yoke 77, resists the clockwise movement of the yoke, which is effected by actuation of bars 52 upon depression of a key lever 59, and serves, when the operator lets go of the key, to restore the yoke and the slides.

The restored counterclockwise position of yoke 77 is normally determined by engagement of lugs 52a of the selector slides 52 with the right hand end guide bar 74 (Fig. 4). However, should the slides be removed, the spring 80 could move the yoke 77 further counterclockwise only a slight amount before the yoke would be arrested by engagement of the horizontally bent end of a rearward extension 82 of the yoke with a stop screw 83. Also, when the slides 52 are removed, the bell crank levers 53 may move only between limits defined by the ends of a slot in a plate 70 (see Fig. 4) through which the horizontal arms of the bell crank levers pass. By the provision of these auxiliary stops for yoke 77 and bell crank levers 53, the slides 52 may be reinserted without difficulty into proper correlation with the yoke and the bell crank levers.

Rearward extension 82 of yoke 77 carries a pivot stud 82' for an L-shaped lever 81, the upper end of which extends through a notched portion (see Fig. 5) of the blade 86 underlying the lower spring leaf 85' (see also Fig. 11) of the normally open switch 85, the closure of which is adapted to complete a circuit for energizing the punch magnet 12. The upper end of lever 81 is formed with an angular notch 81', the side of which normally abuts the side of the notched portion of blade 86 while the bottom is directly under the blade 86. Upon depression of a key lever, at least one selector slide 52 is actuated to the left and its left edge acts on pin 78 to rock yoke 77 clockwise. As a result, lever 81 is raised bodily, causing the bottom of angular notch 81' to engage and lift the blade 86, thereby closing switch 85. The closure of switch 85 is timed to occur after the actuation of slide or slides 52 has resulted in the setting of the interposer lugs 39' in punch operating position. Upon closure of switch 85, punch magnet 12 is energized, rocking the armature lever 18 clockwise (Fig. 8), to pull down on link 36, which in turn, rocks the depressor assembly 34, 38 downwardly (Fig. 10). The operatively positioned interposer lugs 39' thereupon act on the heads of the punches 30 underneath to force these punches through the card, thereby perforating the column in punching position with the coded representation of the character marked on the depressed key lever 59.

The punching operation having been completed, it is now necessary to deenergize punch magnet 12 by opening switch 85. For this purpose, the following means are provided:

Attached to armature 20 is a plate 87 (Figs. 4, 5, and 11) connected to the upper end of a link 88 which at the lower end, is connected to a lever 90, pivoted on a fixed angle bar 91. Initially, the nose 89 of lever 90 is at a distance above the tail of the switch-operating lever 81. When the punch magnet 12 is energized to cause operation of the punches, armature 20 is attracted and, through plate 87, elevates link 88 to rock the lever 90 counterclockwise (Fig. 11), as a result of which the nose 89 of the lever moves down and contacts the tail of lever 81 to rock the latter clockwise (Fig. 4). As lever 81 rocks clockwise, the angular notch 81' in the upper end thereof withdraws its support from blade 86, permitting the lower spring contact leaf 85' of switch 85 to spring downwardly and the switch to open. As blade 86 is also lowered by the switch leaf 85', the notched side of blade 86 engages the side of the lever 81, which has been rocked clockwise, thus preventing return of the latter lever counterclockwise after lever 90 has been restored and while lever 81 remains in raised position. The initial distance of nose 89 of lever 90 above the tail of switch-operating lever 81 is such as to cause the opening of switch 85 to be deferred till after punches 30 have been driven through the card to punch the selected character representation. As switch 85 opens, punch magnet 12 is deenergized with resulting restoration of the punches, of the punch-operating apparatus, and of the remaining parts connected to the armature 20 and including lever 90. When the operator lets go of the active key lever 59, spring 80 (Fig. 4) becomes effective to restore yoke 77 and, through the pin 78 of the yoke, to restore the actuated selector slides 52. As yoke 77 returns to normal, lever 81 is lowered, and when the bottom of notch 81' thereof reaches below the blade 86, the spring 84 becomes effective to rock this lever counterclockwise, locating the bottom of the notch underneath the blade in readiness to close the switch 85 again when the operator next operates a key lever 59.

*The card carriage and feeding means*

Since the card is punched in one column or card section at a time, means must be provided for moving the card laterally to dispose the card columns or sections successively in punching position between the punches 30 and die plate 27. This lateral feed of the card is normally effected by step by step feeding means controlled by the punch operating means as an incident to but following each punching operation. As is usual in punching means for record cards, means are also provided to effect a feed step under control of a space key of the keyboard without an accompanying punching operation. In addition, a release key of the keyboard is provided, operation of which causes a continuous feed of the card to its final position without accompanying punching operation.

Before describing the card feeding means, the space and release key mechanisms will be explained, with particular reference to Figs. 1, 5, and 12. The space key is in the form of a bar 93 bridging a pair of arms 92 which, at their rear ends, are fixed to a sleeve 99 rotatably surrounding a shaft 96 journaled by pointed screws 97 carried by the side bars 54 and 55 of the subframe. The release key 95 is a similar bar bridging arms 94 fixed to a sleeve 98 pinned to the shaft 96. A spring 101 (Fig. 5) connected to one of the arms 92 of the space key mechanism holds the space key in upper, idle position. At the left of sleeve 99 is an arm 100 also rotatably carried by shaft 96 and held by a spring 105 against a pin 106 extending from the left arm 92. Thus, arm 100 is constrained to move rearwardly or counterclockwise (as viewed in Fig. 8) by pin 106 when the space key mechanism is restored by spring 101, but is yieldably urged by spring 105 to move forwardly or clockwise, together with arms 92, when the operator depresses the space key. During its forward movement, the upper, blunt end of arm 100 engages and operates a lever 104 of the escapement mechanism (see Figs. 6, 7, 13, and 14) for effecting a single step of feed of the card, as will be further explained later. The release key mechanism is held in restored position by a spring 102 (Figs. 5 and 8) between angle bar 69 and one arm of a bell crank lever 103, pinned similarly to release key sleeve 98 to the shaft 96. Extending from the other arm of the lever 103 is a pin 110 against which the short side of a U-shaped yoke or lever 107 is yieldably held by a spring 109 (Figs. 5 and 8). Yoke 107 is rotatably carried by shaft 96 and located between arm 100 and lever 103. The lever 107 is constrained by pin 110 to move rearwardly upon restoration of the release key mechanism by spring 102, and is yieldably urged forwardly by spring 109 to follow the pin in the opposite direction when the release key is depressed. The long side of yoke or lever 107 extends vertically and upon its forward movement, the upper end thereof strikes the escapement release lever 108 (see Figs. 6, 7, 13, and 14) to cause release of the escapement mechanism of the card feeding means, as will be further described later.

The card feeding mechanism proper will now be described, with reference particularly to Figs. 6, 7, 13, and 14. The card carriage comprises a bar 115 (also see Figs. 8 and 11) movable below the card bed or support 11a which is part of the top of the frame and housing 11. Near its opposite ends, the bar 115 rigidly carries axles 116, the ends of which rotatably mount the rollers 117 which ride between upper and lower tracks 125 and 127 connected by bolts 126 (see Fig. 11). To the top of and at one end of bar 115 is secured a bracket 118 carrying the adjustable abutment 119 for the right edge of the card (see also Fig. 1). To the top of the other end of bar 115 is secured the handle 120 which is moved by the operator to the right to return the card carriage to the starting position. Handle 120 pivotally carries the spring-pressed clip 121 for the left edge portion of the card. The abutment 119 and clip 121 hold a card between them to move the card together with bar 115 of the card carriage, the frame ledge 11a serving as a supporting bed on which the card lies during its movement with the carriage. The limits of travel of the card carriage are determined by screws 131 (only one is shown) which engage the ends of the bar 115.

Below bar 115 and secured thereto by bolts 122 are rack 123 and escapement bar 124. Rack 123 is toothed on opposite sides, and meshed with the teeth of one side of rack 123 is the drive pinion 133 connected to a spring motor 132, the two latter parts being mounted on a fixed frame plate 134. The teeth on the opposite side of rack 123 are geared to a governor comprising parts 135, 136, 137, 138, and 139, all mounted on a frame plate 140. Return of the card carriage by handle 120 to starting position energizes the spring motor 132, storing power therein which is utilized to move the carriage through its forward stroke. The forward travel of the card carriage is governed by the usual escapement mechanism which includes the ratchet toothed escapement bar 124, already referred to, and a holding dog 141 normally free of the escapement teeth. Dog 141 is pivotally mounted on a pin 144 carried by the frame plate 143 secured to the machine frame 11. The dog 141 has a pin and slot connection 141' with the hereinbefore mentioned lever 104, whereby the operation of the lever controls the operation of the dog, the restored positions of both being determined by engagement of the tail of the dog with a stop screw 145. Lever 104 is pivoted on a pin 147 carried by a member 146 which is rockably mounted on a pivot stud 148 fastened to frame plate 143 (see Figs. 6, 7, and 14). Member 146 is held by a spring leaf 149 against an adjustable stop screw 150, adjustment of which determines the position of pivot pin 147. Pin 147 rotatably mounts not only lever 104 but also escapement release lever 108 and the escapement pawl 142. The pawl is formed with a slot 142' into which a pin 151 of the lever 104 projects for rocking the pawl upwardly upon counterclockwise movement of the lever. Normally, the pawl 142 engages with a tooth of the escapement bar 124 to prevent forward travel of the card carriage. Upon energization of the punch magnet 12, the armature 20 acts through a spring 152 (Fig. 13) to rock a lever 153 which is engaged with one arm of the lever 104 (see Fig. 7) so as to rock the latter counterclockwise against resistance of spring 155. Through the pin and slot connection 141', this movement of lever 104 forces the nose of dog 141 into engagement with a tooth of the escapement bar 124. Pin 151 has vertical play in the slot of pawl 142 and, before this play is taken up, the dog 141 engages the escapement bar to prevent forward travel of the card carriage. Continued counterclockwise action of the lever 104 lifts the pawl 142 out of engagement with the escapement rack which is now being restrained by dog 141. As pawl 142 releases the bar 124, a spring 156 moves the pawl bodily to the right (Fig. 7), this being permitted by the loose mounting of the pawl on the pivot stud 147, so as to dispose the nose of the pawl above the next tooth of the escapement bar. The parts remain in this position until after the punches 30 have been depressed through the card to punch the selected designation. As previously explained, at the end of the punch operating stroke of armature 20, the switch 85 opens to deenergize the punch magnet 12. Consequently, as armature 20 is restored, the spring 152 relaxes and lever 153 (Figs. 7 and 13) returns to normal position, releasing lever 104 for clockwise restoration by its spring 155. As lever 104 rocks clockwise, spring 156 returns the pawl 142 into engagement with the next tooth of the escapement rack 124. Clockwise action of lever 104 also acts through pin and slot connection 141' to release dog 141 from the rack 124, permitting the spring motor 132 to advance the card carriage one step before being stopped by the pawl 142, and thereby locating the next column between the punches and dies. The support 146 of pivot stud 147 is so adjusted and the escapement parts so proportioned as to cause the entire escapement step of the card carriage to take place during the restoration of the armature 20.

The escapement step described above may be effected, without an accompanying punching operation, by the operation of the space key 93. As shown in Fig. 13, the free end of arm 100 of the space key mechanism engages the escapement lever 104. When the space key is depressed, the arm 100 rocks forwardly to actuate the lever 104 in a counterclockwise direction (Fig. 7), causing dog 141 to engage the escapement rack 124 and the pawl 142 to release the rack. Upon release by the operator of the space key, the lever 104 returns to normal, causing an escapement step to occur in the same manner as described before.

Figure 7:
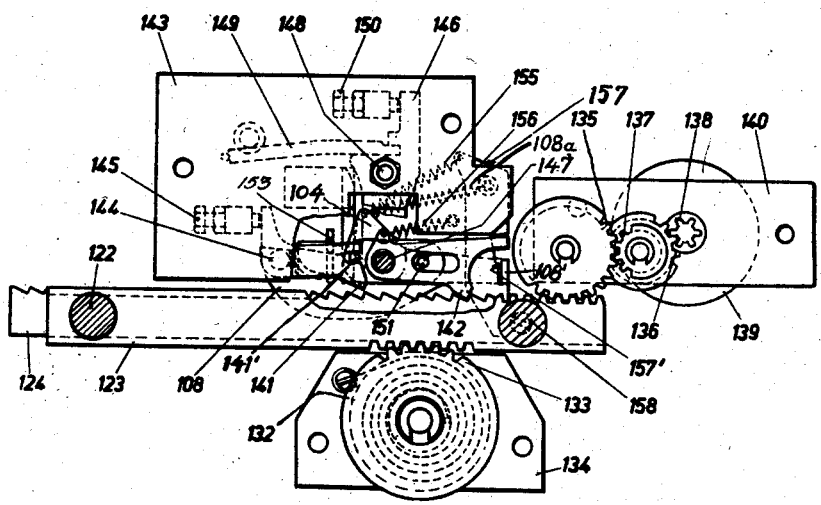
Fig. 7 is a plan view of the card carriage and its escapement mechanism.

The escapement mechanism is released, when the operator depresses release key 95, for permitting a continuous movement of the card carriage to the end of its forward stroke. Lever 107 of the release key mechanism rocks forwardly as a result of the depression of the release key and moves the lever 108, engaged therewith, counterclockwise (Fig. 7). The lever 108 is formed at its right end with a bent lug 108' which, upon counterclockwise movement of the lever, engages the overhanging portion of escapement pawl 142 to release it from the escapement rack 124, and since the dog 141 remains released, the spring motor 132 becomes effective to continuously move the card carriage to the end of its forward stroke. To retain the lever 108 in its actuated position until the card carriage reaches the end of its forward stroke and even though the operator should let go of release key 95, a latch 157 is pivotally carried by frame plate 143 and formed with a shoulder 157' which springs under the lug 108' when lever 108 is rocked counterclockwise (Fig. 7). Lever 108 is thus retained in operated position even though the operator has let go of the release key. As the carriage nears the end of its forward stroke, a pin 158 (see also Fig. 14) strikes the latch 157 and moves it rearwardly, so that the shoulder 157' releases the lug 108', permitting the spring 108a to restore lever 108, and as a result of the lowering of lug 108', the escapement pawl 142 is returned by its spring 156 into engagement with escape-rack 124.

A plug socket 159 (Figs. 5 and 8) is fixed into the rear wall of the housing 11 to receive a plug 160 for connecting the punch magnet 12 to an outside source of current.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A machine to punch a record card having a plurality of record decks, one above another, each deck having lateral sections to be perforated with data representations; comprising punching means including a single set of punches to punch one lateral section of a record deck at a time, means to feed the card laterally step by step to dispose the lateral sections of a deck successively in punching position to be punched with data representations, a movable punch carriage bodily carrying the set of punches, means to shift the punch carriage to shift the set of punches from one deck position, in which the punches are correlated to one deck of the card to punch the sections thereof successively, to a different deck position in which the punches are correlated to a different deck of the card to punch the sections of the latter deck successively, data selecting means, and means controlled by the data selecting means for cooperating with the set of punches, in any of said deck positions, to select the punches for punching the selected data.

2. A machine to punch a record having a plurality of record decks, one vertically above another, with each deck having lateral sections to be perforated with data representations; comprising punching means including a set of punches and dies to punch one section of a record deck at a time, means mounting the punches and dies as a perforating unit for bodily movement vertically, with respect to the record, means for selecting different record decks to be punched by shifting said perforating unit vertically of the record from one deck position in which the punches and dies may punch the lateral sections of one deck of the record to a different deck position for punching the sections of a different deck of the record, and means for feeding the record laterally, step by step, to locate the lateral sections of the selected record deck successively in punching position between the punches and dies to be punched in succession.

3. A machine according to claim 2, the means for mounting the perforating unit including a punch carriage having a slide member coacting with the machine frame to mount the carriage for slidable movement so as to shift the perforating unit therewith from one deck position to another deck position, and a punch carrier and guide device rigidly supported only at the rear end by the punch carriage and extending forwardly freely over the card section in punching position.

4. A machine as defined in claim 2, including also punch selecting means comprising keys, selector slides selectively operated under control of the keys, punch interposers carried by the punch carriage, cable connections between the slides and the interposers cooperatively related to the interposers in any of the deck selecting positions of the punch carriage for setting the interposers to select the punches for operation, a punch magnet and armature mounted apart from the punch carriage, a rocker plate on the punch carriage for acting through the interposers to operate the selected punches, and means connected to the armature and having a cardan joint connection with the rocker plate to operate the latter, in any of the deck-selecting positions of the punch carriage, upon actuation of the armature by the magnet.

5. A machine to punch a record card which includes a pair of record decks, one above the other, with each deck having lateral sections to be perforated with data representations; comprising a punching unit for punching one section at a time and including a set of punches and coacting dies between which the section is positioned to be punched, manual means for selecting the punches to be operated, a punch carriage bodily carrying the punching unit, means slidably mounting the punch carriage, means to select one or the other of the record decks to be punched by effecting slidable movement of the punch carriage to shift the punching unit from a position to punch the sections of one of the record decks to a position to punch the sections of the other record deck, said carriage including a cantilever support for the set of punches extending freely above a section, of either deck, in punching position and terminating short of one end of the latter section whereby writing in the said end is exposed as a guide to the operation of the manual punch selecting means, a card carriage for holding the card with either selected deck thereof in position to be punched, and means for feeding the card carriage laterally to dispose the sections of either selected deck successively in punching position between the punches and dies.

6. The machine as defined in claim 5, and operating means for operating the selected punches comprising a punch actuator mounted apart from the punch carriage and operating connections between the actuator and the punches including a part shiftable with the punch carriage so as to maintain the punch actuator effective to cause operation of the selected punches in either of the shifted deck-selecting positions of the punch carriage.

MICHAEL MAUL.